(12) United States Patent
Pilot (10) Patent No.: US 10,976,805 B2
(45) Date of Patent: Apr. 13, 2021

(54) CONTROLLING THE PROVISION OF A WARNING IN A VIRTUAL ENVIRONMENT USING A VIRTUAL REALITY SYSTEM

(71) Applicant: International Business Machines Corporation, Armonk, NY (US)

(72) Inventor: Richard Pilot, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/539,178

(22) Filed: Aug. 13, 2019

(65) Prior Publication Data

US 2021/0048878 A1 Feb. 18, 2021

(51) Int. Cl.
*G06F 3/14* (2006.01)
*G06F 3/01* (2006.01)
*G06F 3/16* (2006.01)
*G09G 5/02* (2006.01)

(52) U.S. Cl.
CPC ............. *G06F 3/011* (2013.01); *G06F 3/016* (2013.01); *G06F 3/165* (2013.01); *G06F 3/167* (2013.01); *G09G 5/02* (2013.01); *G09G 2354/00* (2013.01)

(58) Field of Classification Search
CPC ........................................................ G06F 3/14

USPC ........................................................ 715/702
See application file for complete search history.

(56) References Cited

U.S. PATENT DOCUMENTS

| | | |
|---|---|---|
| 2016/0124502 A1 | 5/2016 | Sawyer |
| 2017/0336863 A1 | 11/2017 | Tilton |
| 2018/0190027 A1 | 7/2018 | Yao |
| 2018/0276891 A1* | 9/2018 | Craner .................... G06T 19/20 |
| 2018/0278908 A1 | 9/2018 | Ross |
| 2019/0000578 A1* | 1/2019 | Yu .......................... A61B 34/10 |

FOREIGN PATENT DOCUMENTS

WO 2017218972 A1 12/2017

* cited by examiner

*Primary Examiner* — Ruay Ho
(74) *Attorney, Agent, or Firm* — Michael A. Petrocelli (57) ABSTRACT

Controlling the provision of a warning to a user in a virtual environment of a virtual reality (VR) system are presented as embodiments of a method, system, and computer program product. One example comprises identifying one or more elements within a user's virtual environment. Each element is associated with a descriptor that describes an expected user behavior associated with the element. Based on the descriptor of each of the one or more identified elements, the method then comprises controlling the provision of a warning to the user.

20 Claims, 5 Drawing Sheets

CONTROLLING THE PROVISION OF A WARNING IN A VIRTUAL ENVIRONMENT USING A VIRTUAL REALITY SYSTEM

BACKGROUND

The present invention relates generally to the provision of a virtual environment, and more particularly to controlling the provision of a warning to a user in a virtual environment of a virtual reality (VR) system.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for controlling the provision of a warning to a user in a virtual environment of a VR system.

A VR system provides the means to immerse a user in artificial (i.e. virtual) environments. Traditional VR systems typically use virtual reality headsets to generate realistic images, sounds and other sensations that simulate a user's physical presence in a virtual environment. A person using VR equipment is typically able to look around the artificial world, move around in it, and interact with virtual features or objects provided in the. Virtual reality typically incorporates auditory and video feedback, but may also allow other types of sensory and force feedback through haptic technology.

The effect is commonly created by VR headsets consisting of a head-mounted display with a small screen in front of the eyes. As a result, when using the VR headset, the user is visually shut-off from their physical surroundings. Further, an audio headset (external/internal to the VR headset) may also be used by the user to incorporate auditory feedback in the VR experience. The user may consequently also be aurally shut-off from their physical surroundings. The lack of awareness of the physical surroundings of the user when using the VR system therefore introduces a risk of the user experiencing potential collisions in the user's physical environment (i.e. with objects, walls, and people). This further introduces a risk of injury to the user and/or damage to the VR system and physical surroundings. Some traditional VR systems enable the user to define a safe boundary within the user's physical surroundings, i.e. an area in the user's physical space where they can interact without the risk of physical collision. The safe boundary is typically hidden from the user when experiencing the VR environment in a VR application, until the user approaches the edge of the defined bounds, and a virtual barrier fades into view. In this way, the user is alerted to the close proximity of the physical objects. The decision of when to display the bounds is based on the position of the tracked apparatus of the VR system, i.e. controllers and headset.

An issue with this approach to the provision of warning is that, if the user moves suddenly or performs a sudden action that results in passing through the defined safe boundary, the system may not have enough time to provide a warning to the user before the action is completed. For example, the user may perform a high-velocity action, e.g. hitting a virtual entity, throwing a virtual object, or quickly turning around. This action may bring the user towards the edge of and beyond the defined safe boundary. This may not leave the user with enough time to acknowledge and/or physically react to the warning, resulting in a potential collision with the physical surroundings outside the defined safe boundary.

SUMMARY

The present invention seeks to provide a computer-implemented method for controlling the provision of a warning to a user in a virtual environment of a virtual reality (VR) system.

The present invention further seeks to provide a computer program product including computer program code for implementing a proposed method when executed by a controller unit.

The present invention also seeks to provide a processing system adapted to execute this computer program code.

The present invention also seeks to provide a system for controlling the provision of a warning to a user in a virtual environment of a VR system.

According to an aspect of the present invention, there is provided a computer-implemented method. The method comprises identifying one or more elements within a user's virtual environment. Each element is associated with a descriptor that describes an expected user behavior associated with the element. Based on the descriptor of each of the one or more identified elements, the method then comprises controlling the provision of a warning to the user.

According to yet another aspect of the invention, there is provided a system for controlling the provision of a warning to a user in a virtual environment of a VR system. The system comprises an identifying unit configured to identify one or more elements within the user's virtual environment. Each element is associated with a descriptor that describes an expected user behavior associated with the element. The system further comprises a control unit configured to, based on the descriptor of each of the one or more identified elements, control the provision of the warning to the user.

According to another aspect of the invention, there is provided a computer program product for controlling the provision of a warning to a user in a virtual environment of a VR system. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Concepts for controlling the provision of a warning to a user in a virtual environment of a virtual reality (VR) system are proposed. Such concepts may involve a concept of predicting the user's behavior based on the context of the user's virtual environment, such that behavior which has a higher risk of collision may be identified. Accordingly, embodiments may facilitate controlling the provision of a warning to a user in a virtual environment based on expected or predicted behavior of the user, wherein such expected or predicted behavior may be determined using descriptors associated with elements within the user's virtual environment.

Embodiments may be implemented in conjunction with tagging of virtual elements with their associated context, such that each virtual element within the user's virtual environment is "tagged" (i.e. labelled) with information (i.e. metadata) relating to an expected user behavior associated with the element. Such tags may be thought of a descriptors which describe expected user behavior associated with virtual elements. The tags may therefore provide contextual information that is useful for determining how a user may be expected to behave when using or interacting with the virtual element(s).

Proposed embodiments may employ a concept of identifying contextual information associated with virtual elements in a virtual environment, and predicting the expected user behavior based on the identified context. Such contextual information may indicate or identify typical or expected user activity when interacting with the virtual elements. In this way, the context information may be leveraged to determine or predict user behavior within the virtual environment before such behavior occurs. Embodiments may therefore enable the provision of a warning in advance of certain behaviors (which would otherwise not provide enough time for a warning to be provided if such behaviors are needed to be detected). User behavior or activity may therefore be pre-empted by embodiments and warnings thus generated and controlled appropriately.

The inventors propose the provision of a control unit. Such a control unit may be configured to, based on the descriptor of each of the one or more identified elements, control the provision of the warning to the user. For example, the control unit may be further configured to predict the expected user behavior associated with each element based on the descriptor of each of the one or more identified elements. The control unit may be further configured to control the provision of the warning to the user based on the predicted expected user behavior. Further, the expected user behavior associated with each element may comprise at least one of a physical user movement and a physical user position. The physical user movement may comprise at least one of a movement velocity and a movement distance. Controlling the provision of the warning to the user minimizes the risk of collision in the user's physical environment when using the VR system.

Embodiments may thus facilitate adjusting the provision of an early (e.g. preventative) warning to a user in a virtual environment that enables the user to acknowledge and react to the received warning prior to a collision within the user's physical environment in response to a high-velocity action. This may reduce the risk of potential collisions when using the VR system, particularly when performing a high-velocity action, thus reducing the risk of injury to the user and potential damage to any objects within the user's physical surroundings.

In a proposed embodiment, controlling the provision of the warning to the user may comprise predicting the expected user behavior based on the descriptor of each of the one or more identified elements. The step may further comprise controlling the provision of the warning to the user based on the predicted expected user behavior. In this way, the expected user behavior associated with each of the one or more identified elements may be used to determine a prediction for the expected user behavior of the user in the virtual environment in the context of the one or more identified elements. This may enable the predicted expected user behavior to be continuously amended and updated based on the one or more identified elements, which may improve the accuracy of the prediction. As a result, the reliability of controlling the provision of the warning to the user may be improved.

In some embodiments, descriptors may be created and associated with each of the elements by the developer of the VR application. If the elements in the VR application do not comprise associated descriptors, embodiments may facilitate creating and assigning a descriptor to an element in response to the user interacting with the element. This ensures that each of the one or more identified elements has an associated descriptor. The system may track the user's actions, e.g. by using an accelerometer. In response to the user interacting with an element, a descriptor describing the expected user behavior associated with the element is assigned to the element.

In a proposed embodiment, the expected user behavior associated with each element may comprise at least one of a physical user movement and a physical user position. The physical user movement may further comprise at least one of a movement velocity and a movement distance. In this way, the accuracy and reliability of predicting the user's behavior may be improved. The descriptor associated with each of the one or more identified elements may thus provide an indication of the probability of occurrence of specific actions associated with each element. For example, the specific actions may include a high-risk action (i.e. an action that requires a high velocity or a large distance to complete, that increases the risk of collision). The physical user position and physical user movement (including the movement velocity and/or movement distance) may enable a more accurate representation of the expected user behavior based on the one or more identified elements to be determined. Consequently, this may improve the accuracy and efficiency of controlling the provision of the warning to the user.

In some embodiments, identifying the one or more elements within the user's virtual environment may comprise defining a context in the user's virtual environment. The context may comprise at least one of a virtual area, a story narrative, an event, and an objective. The step may further comprise identifying one or more elements within the defined context. In this way, controlling the provision of a warning to the user may be based on the context of the user's virtual experience. This may reduce the number of elements that require identifying to the elements within the user's defined context, which consequently may reduce the time and processing required to identify the one or more elements and may increase the efficiency of the system. This may minimize the risk of identifying elements that the user may not interact with, and may ensure that the one or more identified elements are elements that the user may interact with. Further, by defining a context in the user's virtual environment and identifying one or more elements within the defined context, the system may be provided with contextual information relating to the specific information relating to the expected user behavior associated with each element with respect to the defined context.

In some embodiments, the one or more elements within the user's virtual environment may comprise at least one of an object, a location, an attribute, an objective, and an inter-element relation. In this way, the predicted expected user behavior may be based on one or more types of elements, which may improve the perception of the context of the user's virtual environment, thus improving the accuracy of the prediction. As a result, the accuracy of controlling the provision of the warning to the user may be improved.

In some embodiments, controlling the provision of the warning to the user may comprise defining at least one of a velocity threshold, a distance threshold, and a physical boundary in the user's physical environment. The step may further comprise controlling the provision of the warning to the user in response to assessing at least one of the movement velocity against the velocity threshold, the movement distance against the distance threshold, and the physical user position against the physical boundary in the user's physical environment. In this way, the defined thresholds enable the classification of expected user behavior with respect to the risk of collision associated with the expected user behavior. For example, an expected user behavior that includes a movement velocity greater than or equal to the velocity threshold, a movement distance greater than or equal to the distance threshold, and/or a physical user position outside of or at the physical boundary may be classified as a high-risk action. A user behavior that includes a movement velocity less than the velocity threshold, a movement distance less than the distance threshold, and/or a physical user position within the physical boundary may be classified as a low-risk action. As a result, the provision of the warning to the user may be controlled based on the degree of risk associated with the expected user behavior. Further, the velocity threshold, distance threshold, and/or the physical boundary may be adjusted by the user in order to adjust the sensitivity of the system. Conversely, the sensitivity of the system may be adjusted by the user in order to adjust the velocity threshold, distance threshold, and/or the physical boundary.

In some embodiments, controlling the provision of the warning to the user may comprise providing at least one of a visual, audible, and haptic feedback of a warning to the user. The step may further comprise adjusting at least one of an opacity of the visual feedback, a volume and/or frequency of the audible feedback, a magnitude and/or frequency of the haptic feedback, and a time between identifying the one or more elements and providing the at least one of the visual, audible, and haptic feedback. In this way, the warning to the user may be incorporated into the user's virtual environment, which may minimize the risk of detracting from the user's immersion within the virtual environment as a result of the warning. The feedback may be provided through components that are standard of a traditional VR system (i.e. visual and audible feedback through a VR headset and haptic feedback through VR handheld controllers). This may reduce the cost of controlling the provision of the warning to the user. Additionally, adjusting the parameters of the feedback discussed above may enable the feedback to be blended or faded into and out of the user's VR experience, such that the risk of detracting from the user's immersion within the virtual environment may be minimized.

In some embodiments, the visual feedback may comprise a virtual boundary representing the physical boundary in the user's physical environment. In this way, the user may be made aware of the physical boundary within the user's virtual environment. This may ensure that the user is able to identify the physical boundary without needing to remove the VR headset and consequently detract from the immersion of the user's VR experience.

Figure 1:
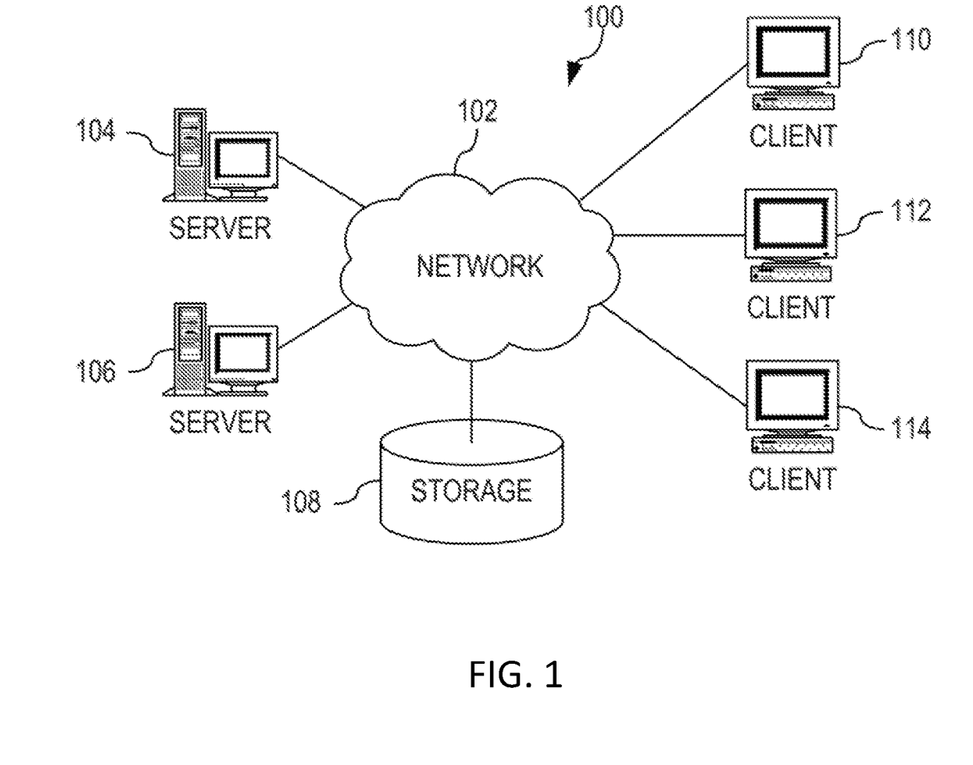
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
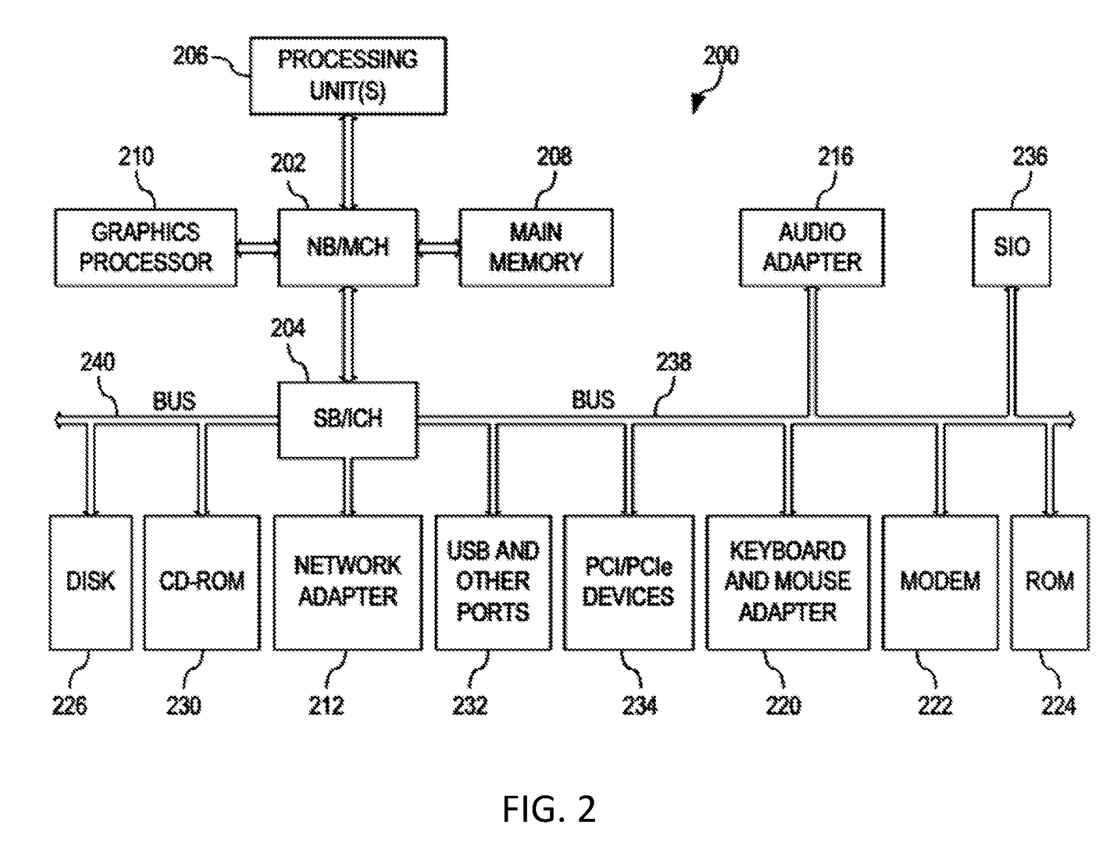
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
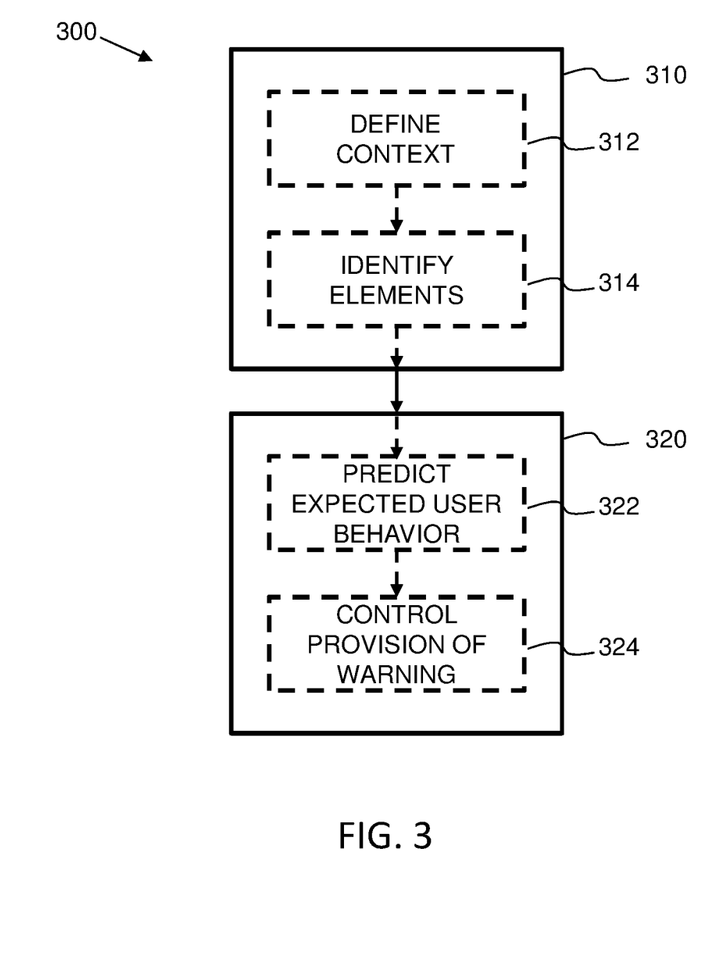
FIG. 3 is a flow diagram of a computer-implemented method for controlling the provision of a warning to a user in a virtual environment of a VR system.

Referring now to FIG. 3, there is depicted a flow diagram of a computer-implemented method 300 for controlling the provision of a warning to a user in a virtual environment of a VR system.

Step 310 comprises identifying one or more elements within the user's virtual environment. Each element is associated with a descriptor that describes an expected user behavior associated with the element. For example, the user may enter a virtual area (e.g. a room) that includes one or more virtual objects, such as a ball, a table, and a carpet. Each of the virtual objects includes a descriptor which describes an expected user behavior associated with the virtual object. In the example, an expected user behavior associated with the ball consists of an act of throwing the ball. The descriptor associated with the element, in this case the ball, comprises further expected user behavior, for example holding the ball, bouncing the ball, and placing the ball down. An expected user behavior associated with the carpet consists of the user standing on the carpet. This contextual information is attached to each element through the descriptor associated with the element.

In an embodiment, the expected user behavior comprises at least one of a physical user movement and a physical user position. The physical user movement further comprises at least one of a movement velocity and a movement distance. In the example, the expected user behavior associated with the ball includes the expected act of throwing the ball. The descriptor holds information on how fast and/or how far the user's arm is expected to move during the throw, as well as the final position of the user's arm at the end of the throw).

In an embodiment, identifying the one or more elements within the user's virtual environment comprises steps 312 and 314. Step 312 comprises defining a context in the user's virtual environment. The context comprises at least one of a virtual area, a story narrative, an event, and an objective. Step 314 comprises identifying one or more elements within the defined context. In the example, the defined virtual area may be the room. Other examples of a virtual area include, but are not limited to, a vehicle, a street, and a field. For example, the user may step into a virtual boxing ring where punching motions are expected. As an example, the story narrative includes, but is not limited to, a specific point within a story of a VR application, e.g. entering a fight with an enemy, starting a sports match, or interacting with a non-playable character (NPC). As an example, an event includes, but is not limited to, contextual occurrence, e.g. a festival, a meeting, a battle, or a race. As an example, an objective includes, but is not limited to, achieving a target within the VR application, e.g. defeating an enemy, winning a race, finding an object. In the example discussed above, the virtual area is a room, the story narrative consists of winning a ball game to continue progressing within the VR application, the event is a ball game competition, and the objective is to hit a target with the ball.

In an embodiment, the one or more elements within the user's virtual environment comprise at least one of an object, a location, an attribute, an objective, and an inter-element relation. For example, the object includes, but is not limited to, a ball, a table, or a carpet. For example, the location includes, but is not limited to, a room, an outside area, or the interior of a vehicle. Examples of an attribute include, but are not limited to, a color of an object, a shape of an object, and a location of an object. Examples of an objective include, but are not limited to, defeating an enemy, winning a race, and finding an object. An inter-element relation may include how an element is interacting with another element, e.g. a ball resting on a table. In the example discussed above, the one or more elements include a ball (i.e. an object) resting on a table (i.e. an inter-element relation) located in a room (i.e. a location). The ball is round (i.e. an attribute), and the user is required to throw the ball at a target (i.e. an objective).

Step 320 comprises, based on the descriptor of each of the one or more identified elements, controlling the provision of the warning to the user. In the example discussed above, the provision of the warning to the user is controlled based on the descriptors of the identified elements (e.g. a round ball resting on a table located in a room, requiring the user to throw the ball at a target). The descriptors of each of these elements are used to control the provision of the warning to the user.

In an embodiment, controlling the provision of the warning to the user comprises steps 322 and 324. Step 322 comprises predicting the expected user behavior based on the descriptor of each of the one or more identified elements. Step 324 comprises controlling the provision of the warning to the user based on the predicted expected user behavior. In the example discussed above, each of the elements has an associated descriptor. Each of the descriptors describes an expected user behavior associated with its associated element. The descriptor associated with the ball describes an expected act of throwing the ball. The descriptor associated with requiring the user to throw the ball at a target describes an expected act of throwing the ball. The descriptor associated with the roundness of the ball describes an expected act of picking up and holding the ball. As a result, the expected user behavior can be predicted based on the descriptor of each of the one or more identified elements, i.e. an expected act of throwing the ball.

In an embodiment, controlling the provision of the warning to the user comprises defining at least one of a velocity threshold, a distance threshold, and a physical boundary in the user's physical environment. The step further comprises controlling the provision of the warning to the user in response to assessing at least one of the movement velocity against the velocity threshold, the movement distance against the distance threshold, and the physical user position against the physical boundary in the user's physical environment. Thus, the information described by the descriptor relating to the expected user behavior associated with an element is compared against predefined thresholds. The expected user behavior assessed against the one or more thresholds may be for each of the one or more identified elements, or it may be for the overall predicted expected user behavior based on the descriptor of each of the one or more identified elements. In the example discussed above, the expected user behavior includes the act of throwing a ball. The expected velocity and distance of the user's arm during the throw, as well as the expected position of the user's arm at the end of the throw may be predicted based on the descriptor of each of the one or more identified elements. Controlling the provision of the warning to the user is then based on a comparison of the values of the expected user behavior parameters discussed above against the predefined thresholds. Thus, the act of throwing the ball may be classified as a "high-risk" action depending on the values of the parameters. For example, the velocity threshold may be 40 m/s, 35 m/s, 30 m/s, or 25 m/s. The distance threshold may for example be 1 m, 0.8 m, 0.6 m, or 0.5 m. The physical boundary in the user's physical environment may be defined by the user manually in the VR application. Thus, the act of throwing the ball may be classified as a high-risk action in response to the parameters of the act described above being greater than or equal to the defined thresholds. Conversely, the act of throwing the ball may be classified as a low-risk action in response to the parameters of the act described above being less than the defined thresholds. Examples of virtual objects that have an associated descriptor that describes a high-risk action include, but are not limited to, objects that are likely to be thrown (e.g. a ball, a dart, a cup), objects that are likely to be swung (e.g. a bat, a sword), objects that have other movement based actions (e.g. pulling back the string of a bow). Examples of virtual areas that have an associated descriptor that describes a high-risk action include, but are not limited to, a boxing ring, sports arena and a dancefloor. Examples of virtual story narratives that have an associated descriptor that describes a high-risk action include, but are not limited to, entering a fight with an enemy, starting a sports match, or interacting with a non-playable character (NPC).

In an embodiment, controlling the provision of the warning to the user comprises providing at least one of a visual, audible, and haptic feedback of a warning to the user. The step further comprises adjusting at least one of an opacity of the visual feedback, a volume and/or frequency of the audible feedback, a magnitude and/or frequency of the haptic feedback, and a time between identifying the one or more elements and providing the at least one of the visual, audible, and haptic feedback. In an embodiment, the visual feedback comprises a virtual boundary representing the physical boundary in the user's physical environment. Further examples of a visual feedback include, but are not limited to, a warning symbol and/or message in the user's field of view. Examples of an audible feedback include, but are not limited to, a noise or tone being played, and a change in the audio being played as part of the user's VR experience. An example of a haptic feedback includes, but is not limited to, vibrations in a set of VR controllers held by the user. The parameters of the feedbacks described above are adjusted based on the descriptor of each of the one or more identified elements. In the example described above, an expected act of throwing a ball, i.e. the expected user behavior, implies that a high-risk action is expected. This may be determined based on comparison of the act against the defined thresholds described above. As a result, feedback may be adjusted in response to the expected user behavior. For example, the opacity of the virtual boundary representing the physical boundary is increased in response to the user entering the room or picking up the ball in the virtual environment. As the room contains elements that have associated descriptors describing an expected act of throwing a ball at a high velocity (i.e. a velocity higher than a predefined threshold), the opacity of the virtual boundary is increased. In another example, the volume and/or frequency of a tone being played may be increased, or the magnitude and/or frequency of vibrations in a set of VR controllers held by the user may be increased in response to entering the room. Conversely, these parameters may be decreased in response to identifying elements that have descriptors describing expected user behavior that is deemed low-risk (i.e. based on the predefined thresholds).

Figure 4:
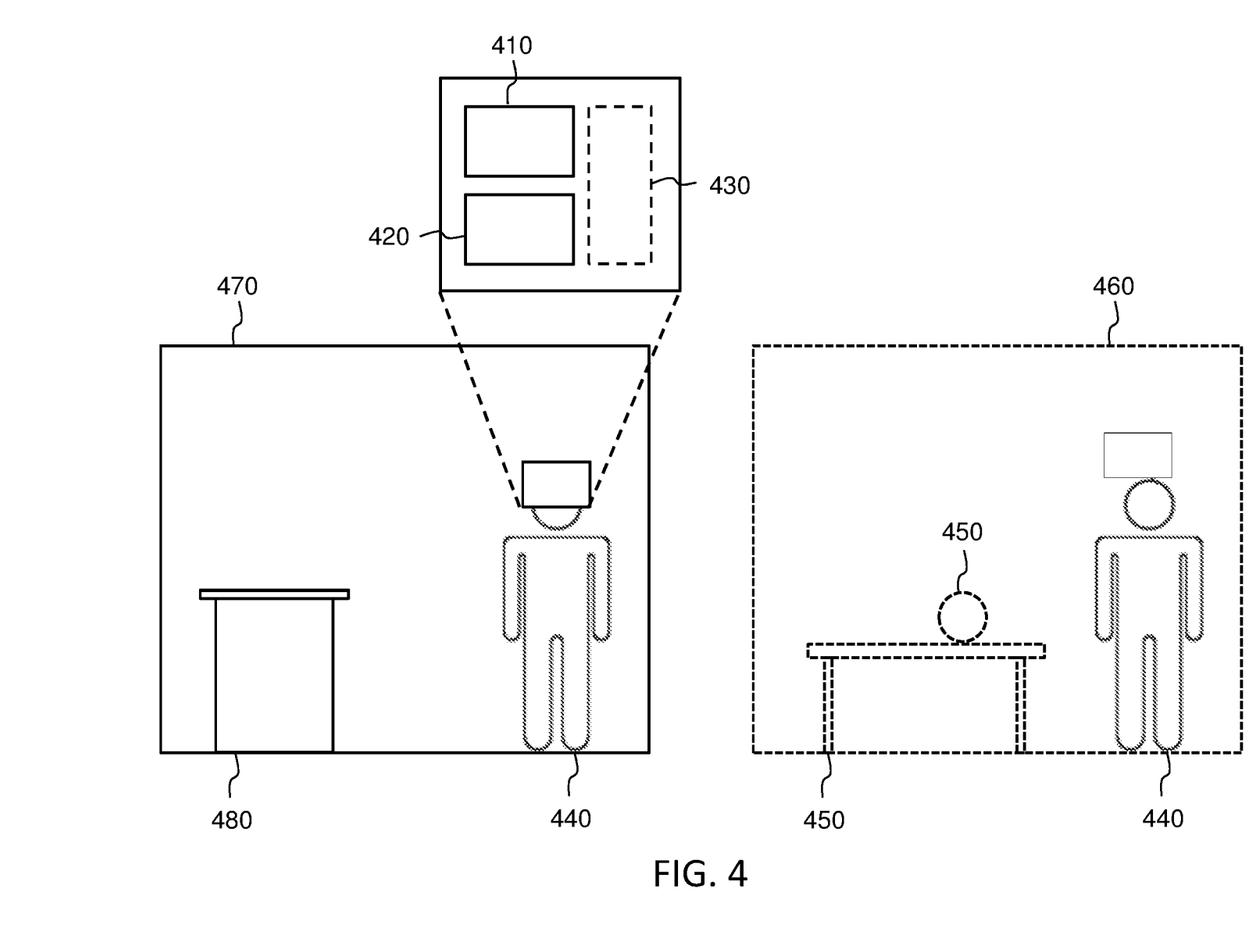
FIG. 4 is a simplified block diagram of an exemplary embodiment of a system for controlling the provision of a warning to a user in a virtual environment of a VR system.

Referring now to FIG. 4, there is depicted a simplified block diagram of an exemplary embodiment of a system for controlling the provision of a warning to a user in a virtual environment of a VR system.

The system comprises an identifying unit 410 configured to identify one or more elements 450 within the user's virtual environment 460. Each element 450 is associated with a descriptor that describes an expected user behavior associated with the element 450. The system further comprises a control unit 420 configured to, based on the descriptor of each of the one or more identified elements 450, control the provision of the warning to the user 440.

In an embodiment, the expected user behavior associated with each element 450 comprises at least one of a physical user movement and a physical user position, and wherein the physical user movement comprises at least one of a movement velocity and a movement distance.

In an embodiment, the identifying unit 410 is configured to define a context in the user's virtual environment 460. The context comprises at least one of a virtual area, a story narrative, an event, and an objective. The identifying unit 410 is further configured to identify one or more elements 450 within the defined context.

In an embodiment, the one or more elements 450 within the user's virtual environment 460 comprise at least one of an object, a location, an attribute, an objective, and an inter-element relation.

In an embodiment, the control unit 420 is configured to predict the expected user behavior based on the descriptor of each of the one or more identified elements 450. The control unit 420 is further configured to control the provision of the warning to the user 440 based on the predicted expected user behavior.

In an embodiment, the control unit 420 is configured to define at least one of a velocity threshold, a distance threshold, and a physical boundary in the user's physical environment 470. The user's physical environment 470 may contain one or more physical objects 480. The physical boundary takes into account the one or more physical objects 480. The control unit 420 is further configured to control the provision of the warning to the user 440 in response to assessing at least one of the movement velocity against the velocity threshold, the movement distance against the distance threshold, and the physical user position against the physical boundary in the user's physical environment 470.

In an embodiment, the control unit 420 is configured to provide at least one of a visual, audible, and haptic feedback of a warning to the user 440 through a user-interface unit 430. The control unit 420 is further configured to adjust at least one of an opacity of the visual feedback, a volume and/or frequency of the audible feedback, a magnitude and/or frequency of the haptic feedback, and a time between identifying the one or more elements 450 and providing the at least one of the visual, audible, and haptic feedback.

In an embodiment, the visual feedback provided to the user 440 through the user-interface unit 430 comprises a virtual boundary representing the physical boundary in the user's physical environment 470.

Figure 5:
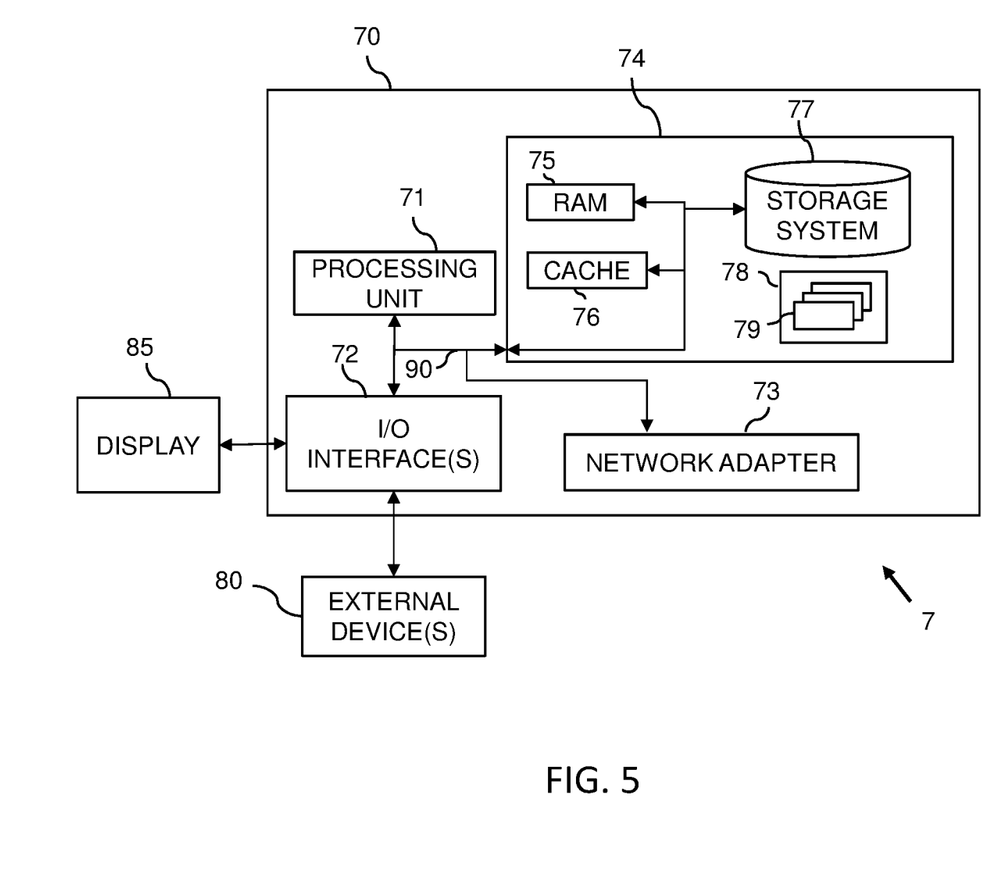
FIG. 5 is a simplified block diagram of an exemplary embodiment of a system for controlling the provision of a warning to a user in a virtual environment of a VR system.

By way of further example, as illustrated in FIG. 5, embodiments may comprise a computer system 70, which may form part of a networked system 7. For instance, a system for controlling the provision of a warning to a user in a virtual environment of a VR system may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program code executable by the processing unit 71 to cause the system to perform a method for controlling the provision of a warning to a user in a virtual environment of a VR system according to a proposed embodiment.

Program/utility 78, having a set (at least one) of program modules 79, may be stored in memory 74. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for controlling the provision of a warning to a user in a virtual environment of a virtual reality, VR, system, the method comprising:
   identifying one or more elements within the user's virtual environment, wherein each element is associated with a descriptor that describes an expected user behavior associated with the element, the descriptor associated with each of the one or more identified elements, respectively, providing an indication of the probability of occurrence of specific actions, by the user, associated with each of the elements; and
   based on the descriptor of each of the one or more identified elements, controlling the provision of the warning to the user.

2. The method of claim 1, wherein the expected user behavior comprises at least one of a physical user movement and a physical user position, and wherein the physical user movement comprises at least one of a movement velocity and a movement distance.

3. The method of claim 1, wherein identifying one or more elements within the user's virtual environment comprises:
   defining a context in the user's virtual environment;
   wherein the context comprises at least one of a virtual area, a story narrative, an event, and an objective; and
   identifying one or more elements within the defined context.

4. The method of claim 1, wherein controlling the provision of the warning to the user comprises:
   predicting the expected user behavior based on the descriptor of each of the one or more identified elements; and
   controlling the provision of the warning to the user based on the predicted expected user behavior.

5. The method of claim 2, wherein controlling the provision of the warning to the user comprises:
   defining at least one of a velocity threshold, a distance threshold, and a physical boundary in the user's physical environment; and
   controlling the provision of the warning to the user in response to assessing at least one of:
   the movement velocity against the velocity threshold;
   the movement distance against the distance threshold; and
   the physical user position against the physical boundary in the user's physical environment.

6. The method of claim 1, wherein controlling the provision of the warning to the user comprises:
   providing at least one of a visual, audible, and haptic feedback of a warning to the user; and
   adjusting at least one of:
   an opacity of the visual feedback;
   a volume and/or frequency of the audible feedback;
   a magnitude and/or frequency of the haptic feedback; and
   a time between identifying the one or more elements and providing the at least one of the visual, audible, and haptic feedback.

7. The method of claim 6, wherein the visual feedback comprises a virtual boundary representing the physical boundary in the user's physical environment.

8. The method of claim 1, wherein the one or more elements within the user's virtual environment comprise at least one of an object, a location, an attribute, an objective, and an inter-element relation.

9. A computer program product for controlling the provision of a warning to a user in a virtual environment of a VR system, the computer program product comprising a computer readable storage medium having program instructions embodied therewith, the program instructions executable by a processing unit to cause the processing unit to perform a method comprising:
   identifying one or more elements within the user's virtual environment, wherein each element is associated with a descriptor that describes an expected user behavior associated with the element, the descriptor associated with each of the one or more identified elements, respectively, providing an indication of the probability of occurrence of specific actions, by the user, associated with each of the elements; and
   based on the descriptor of each of the one or more identified elements, controlling the provision of the warning to the user.

10. The computer program product of claim 9, wherein the expected user behavior comprises at least one of a physical user movement and a physical user position, and wherein the physical user movement comprises at least one of a movement velocity and a movement distance.

11. A system for controlling the provision of a warning to a user in a virtual environment of a VR system, the system comprising:
    an identifying unit configured to identify one or more elements within the user's virtual environment, wherein each element is associated with a descriptor that describes an expected user behavior associated with the element, the descriptor associated with each of the one or more identified elements, respectively, providing an indication of the probability of occurrence of specific actions, by the user, associated with each of the elements; and
    a control unit configured to, based on the descriptor of each of the one or more identified elements, control the provision of the warning to the user.

12. The system of claim 11, wherein the expected user behavior comprises at least one of a physical user movement and a physical user position, and wherein the physical user movement comprises at least one of a movement velocity and a movement distance.

13. The system of claim 11, wherein the identifying unit is configured to:
    define a context in the user's virtual environment;
    wherein the context comprises at least one of a virtual area, a story narrative, an event, and an objective; and
    identify one or more elements within the defined context.

14. The system of claim 11, wherein the control unit is configured to:
    predict the expected user behavior based on the descriptor of each of the one or more identified elements; and
    control the provision of the warning to the user based on the predicted expected user behavior.

15. The system of claim 12, wherein the control unit is configured to:
    define at least one of a velocity threshold, a distance threshold, and a physical boundary in the user's physical environment; and
    control the provision of the warning to the user in response to assessing at least one of:

the movement velocity against the velocity threshold;
the movement distance against the distance threshold; and
the physical user position against the physical boundary in the user's physical environment.

16. The system of claim 11, wherein the control unit is configured to:
provide at least one of a visual, audible, and haptic feedback of a warning to the user through a user-interface unit; and
adjust at least one of:
an opacity of the visual feedback;
a volume and/or frequency of the audible feedback;
a magnitude and/or frequency of the haptic feedback; and
a time between identifying the one or more elements and providing the at least one of the visual, audible, and haptic feedback.

17. The system of claim 16, wherein the visual feedback comprises a virtual boundary representing the physical boundary in the user's physical environment.

18. The system of claim 17, wherein the one or more elements within the user's virtual environment comprise at least one of an object, a location, an attribute, an objective, and an inter-element relation.

19. The system of claim 11, wherein the expected user behavior comprises at least one of a physical user movement and a physical user position, and wherein the physical user movement comprises at least one of a movement velocity and a movement distance.

20. The system of claim 11, wherein identifying one or more elements within the user's virtual environment comprises:
defining a context in the user's virtual environment;
wherein the context comprises at least one of a virtual area, a story narrative, an event, and an objective; and
identifying one or more elements within the defined context.

* * * * *